Feb. 14, 1950     A. SIEGEL     2,497,277

GASOLINE FUEL RESERVE TANK

Filed Aug. 10, 1945

INVENTOR.
ABE SIEGEL
BY
Zoltan H. Polachek
ATTORNEY

Patented Feb. 14, 1950

2,497,277

UNITED STATES PATENT OFFICE 2,497,277

GASOLINE FUEL RESERVE TANK

Abe Siegel, Brooklyn, N. Y.

Application August 10, 1945, Serial No. 610,020

5 Claims. (Cl. 158—46.5)

This invention relates to new and useful improvements in fuel reserve tanks, and has more particular reference to a gasoline reserve tank intended particularly for automobiles.

The new and improved gasoline fuel reserve tank is adapted to be connected with the fuel pump line of the main gasoline tank, and with the carburetor. It is so arranged that the fuel is continuously flowing through the reserve tank. Should the fuel supply be interrupted for any reason, or become exhausted, the reserve tank will be full of reserve gasoline which may be used at will.

It is proposed that the new and improved fuel reserve tank be mounted under the hood of a vehicle or truck. It should be clear that the reserve tank may operate by gravity feed, as well as being directly connected with the fuel pump.

Some of the important features of the new and improved reserve tank may be summarized as follows:

Fresh gasoline will always be passing through the reserve tank during the operation of the vehicle or truck. The level and condition of the gasoline within the reserve tank may always be visible because it is proposed that the reserve tank include a transparent tubular body. The reserve tank is good for testing the mileage that the vehicle or truck can make on a specific quantity of fuel.

It is proposed to provide the reserve tank with a top pet cock by which it may be readily filled. A missing motor may be tested with the fuel directly from this tank to determine whether the fuel pump or the gas line is at fault. Top lubricating oil may be poured into the top filler pet cock of the reserve tank. According to the size of the reserve tank it will supply any vehicle with enough gasoline to reach the nearest gasoline pump or station.

Still further the invention proposes a new and improved fuel reserve tank for automobiles as previously explained, which may be manufactured, sold and installed at a low cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure—

Figure 1:
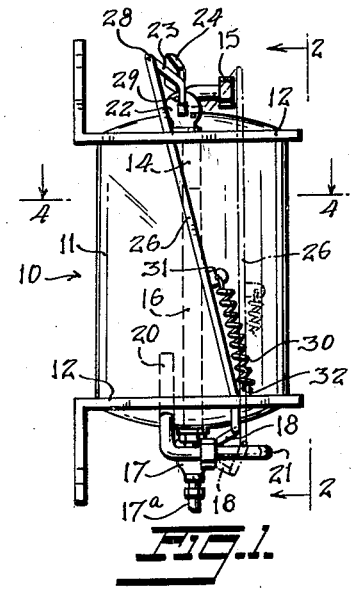
Fig. 1 is a side elevational view of the reserve fuel tank constructed in accordance with the present invention.

The new and improved gasoline reserve tank for automobiles, in accordance with the present invention, includes a container 10. This container 10 is constructed with a central tubular body 11 of transparent material. The body 11 is mounted between top and bottom brackets 12 which may be of any suitable shape. These brackets 12 are held together with a center tie bolt 14. An inlet 15 is mounted upon the top of the container 10 and is for connection with the fuel pump line of the main gasoline tank or in a gravity system for direct connection with the main gasoline tank.

A high feed overflow 16 extends upwards from the bottom of the container 10 and has its bottom end provided with a two way valve 17 from which a pipe 17ª depends for connection with the carburetor of the automobile. This two way valve 17 is provided with a handle 18 by which it may be operated. In one position one of the ways through the valve is open. In another position of the handle 18 the second way through the valve is open.

A low feed overflow 20 is mounted on and through the bottom of the container 10. This low feed overflow 20 is connected by a tube 21 with one of the ways, or one of the branches of the valve 17. A pet cock 22 is mounted upon the top of the container 10. The pet cock 22 is provided with an operating handle 23 by which it may be closed or opened. In the open position, fuel may be poured through a funnel portion 24 on the top of the pet cock 22 and into the container 10.

Figure 6:
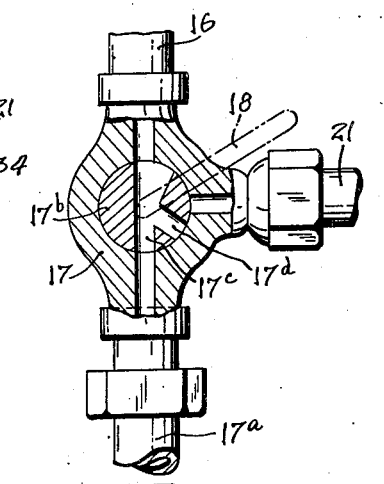
Fig. 6 is an enlarged vertical sectional view of the two-way valve, per se.
Figure 7:
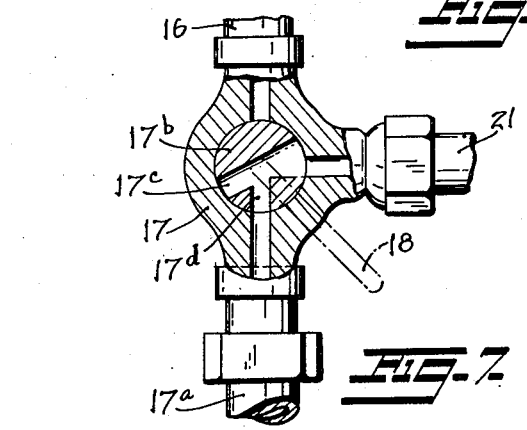
Fig. 7 is a view similar to Fig. 6, but illustrating a different position of the two-way valve.

The valve 17 includes an internal rotative member 17ᵇ, see Figs. 6 and 7, connected to the handle 18 to be turned thereby. The rotative member 17ᵇ is formed with one passage 17ᶜ extended diametrically therethrough for connecting the high feed overflow 16 with the pipe 17ª when the rotative member 17ᵇ is in the position shown in Fig. 6. The member 17ᵇ is also formed with a right angular passage 17ᵈ for connecting the tube 21 from the low feed overflow 20, with the pipe 17a when the rotative member 17b is in the position shown in Fig. 7.

A link 26 connects the handle 23 of the pet cock 22 with the handle 18 of the two way valve 17 in such a way that when the pet cock 22 is closed the first way through the valve 17 is open, and when the pet cock 22 is opened, the second way through the valve 17 is open.

More specifically, the link 26 is connected by a pintle 28 with the handle 23. The handle 23 normally rests against a pin 29 mounted upon the body of the pet cock 22. A spring 30 is connected between a lug 31 mounted on the link 26 and a lug 32 mounted on the bottom bracket 12 of the container 10. This spring 30 normally maintains the handle 23 against the stop pin 29 in which the pet cock 22 is closed and the valve 17 is in the position shown in Fig. 6. The bottom portion 33 of the link 26 is offset inwards and is pivotally connected with the handle 18 of the valve 17 by a pintle 34. A second stop pin 35 is mounted upon the body of the pet cock 22 and is capable of stopping the handle 23 in a position in which the pet cock 22 is open and the valve 17 is in the position shown in Fig. 7.

Figure 2:
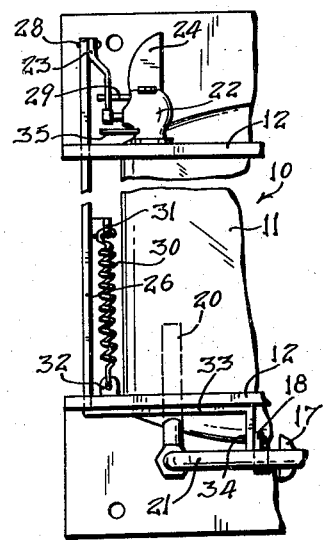
Fig. 2 is a fragmentary enlarged front elevational view looking in the direction of the line 2—2 of Fig. 1.
Figure 3:
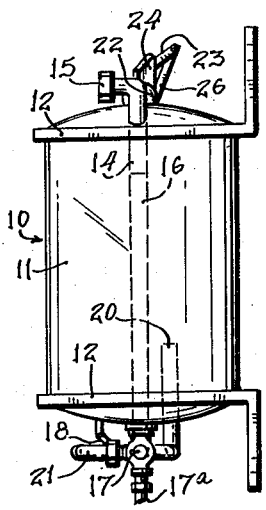
Fig. 3 is a view similar to Fig. 1, but looking from the side opposite that shown in Fig. 1.
Figure 4:
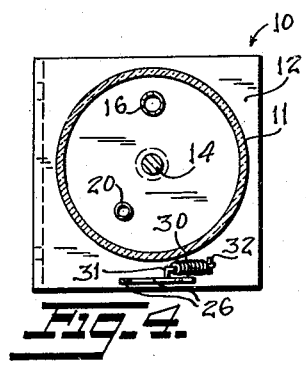
Fig. 4 is a horizontal sectional view taken on line 4—4 of Fig. 1.
Figure 5:
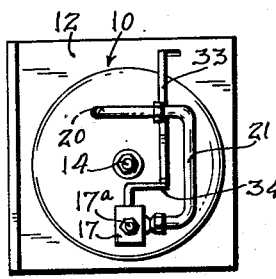
Fig. 5 is a bottom plan view of Fig. 1.

The operation of the invention may best be understood by noting that with the parts as illustrated in Figs. 1 to 3, the pet cock 22 is closed and one way of the valve 17 is opened so that the high feed overflow 16 is passing gasoline through the valve 17, as shown in Fig. 6. When it is desired to use the reserve tank it is merely necessary to manually grip the link 26 and move said link to the position indicated by the dot and dash lines in Fig. 1. When this is done the handle 23 will be moved against the stop pin 35. It should be noted that the spring 30 will maintain the handle 23 in either position because it operates on opposite sides of the dead center of pivoting of the handle 23. When the link 26 is moved to the dot and dash line position, the handle 18 of the two way valve 17 will be moved to its second position, shown in Fig. 7 in which the high feed overflow 16 is shut off and the low feed overflow 20 now discharges the gasoline from the reserve tank through the valve 17 and the pet cock 22 is open.

The reserve tank may be filled with a measured quantity of gasoline by pouring it into the container 10 through the funnel 24 of the pet cock 22.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a gasoline fuel reserve tank having a hollow container connected with a source of liquid fuel and having a high feed overflow and low feed overflow leading from the bottom thereof, a normally closed pet cock mounted on the top of said container to connect the interior thereof with the atmosphere when the liquid fuel in the container is draining through the low feed overflow, a two-way valve having separate branches connected to the high feed overflow and the low feed overflow and normally open to allow the liquid fuel to discharge through said two-way valve through the high feed overflow, a control handle extending radially from said pet cock, a control handle extending radially from said two-way valve, and means interconnecting said handles so that when said control handle of said two-way valve is moved to close the discharge from said high feed overflow and to open the discharge from the low feed overflow the control handle of said pet cock will be moved to open said pet cock and connect the interior of the container with the atmosphere.

2. In a gasoline fuel reserve tank having a hollow container connected with a source of liquid fuel and having a high feed overflow and low feed overflow leading from the bottom thereof, a normally closed pet cock mounted on the top of said container to connect the interior thereof with the atmosphere when the liquid fuel in the container is draining through the low feed overflow, a two-way valve having separate branches connected to the high feed overflow and the low feed overflow and normally open to allow the liquid fuel to discharge through said two-way valve through the high feed overflow, a control handle extending radially from said pet cock, a control handle extending radially from said two-way valve, and means interconnecting said handles so that when said control handle of said two-way valve is moved to close the discharge from said high feed overflow and to open the discharge from the low feed overflow the control handle of said pet cock will be moved to open said pet cock and connect the interior of the container with the atmosphere, said means comprising a link having its ends pivotally connected to the ends of said control handles, and resilient means for holding said link in either of its two positions.

3. In a gasoline fuel reserve tank having a hollow container connected with a source of liquid fuel and having a high feed overflow and low feed overflow leading from the bottom thereof, a normally closed pet cock mounted on the top of said container to connect the interior thereof with the atmosphere when the liquid fuel in the container is draining through the low feed overflow, a two-way valve having separate branches connected to the high feed overflow and the low feed overflow and normally open to allow the liquid fuel to discharge through said two-way valve through the high feed overflow, a control handle extending radially from said pet cock, a control handle extending radially from said two-way valve, and means interconnecting said handles so that when said control handle of said two-way valve is moved to close the discharge from said high feed overflow and to open the discharge from the low feed overflow the control handle of said pet cock will be moved to open said pet cock and connect the interior of the container with the atmosphere, said means comprising a link having its ends pivotally connected to the ends of said control handles, and resilient means for holding said link in either of its two positions, said resilient means comprising a contraction spring connected between said link and the container to pass through a dead center as said link is moved between its two positions.

4. In a gasoline fuel reserve tank having a hollow container connected with a source of liquid fuel and having a high feed overflow and low feed overflow leading from the bottom thereof, a normally closed pet cock mounted on the top of said container, to connect the interior thereof with the atmosphere when the liquid fuel in the container is draining through the low feed overflow, a two-way valve having separate branches connected to the high feed overflow and the low feed overflow and normally open to allow the liquid fuel to discharge through said two-way valve through the high feed overflow, a control handle extending radially from said pet cock, a control handle extending radially from said two-way valve, and means interconnecting said handles so that when said control handle of said two-way valve is moved to close the discharge from said high feed overflow and to open the discharge from the low feed overflow the control handle of said pet cock will be moved to open said pet cock and connect the interior of the container with the atmosphere, said means comprising a link having its ends pivotally connected to the ends of said control handles, and resilient means for holding said link in either of its two positions, said resilient means comprising a contraction spring connected between said link and the container to pass through a dead center as said link is moved between its two positions, and a projecting lug mounted on an intermediate portion of said link and to which one end of said spring is attached.

5. In a gasoline fuel reserve tank having a hollow container connected with a source of liquid fuel and having a high feed overflow and low feed overflow leading from the bottom thereof, a normally closed pet cock mounted on the top of said container to connect the interior thereof with the atmosphere when the liquid fuel in the container is draining through the low feed overflow, a two-way valve having separate branches connected to the high feed overflow and the low feed overflow and normally open to allow the liquid fuel to discharge through said two-way valve through the high feed overflow, a control handle extending radially from said pet cock, a control handle extending radially from said two-way valve, and means interconnecting said handles so that when said control handle of said two-way valve is moved to close the discharge from said high feed overflow and to open the discharge from the low feed overflow the control handle of said pet cock will be moved to open said pet cock and connect the interior of the container with the atmosphere, said means comprising a link having its ends pivotally connected to the ends of said control handles, and resilient means for holding said link in either of its two positions, said two-way valve being located beneath the container and said link being formed with an offset bottom portion extended beneath the container and pivotally connected to the handle of said two-way valve.

ABE SIEGEL.

REFERENCES CITED

The following references are of record in the file of this patent:

UNITED STATES PATENTS

| Number | Name | Date |
| --- | --- | --- |
| 1,072,371 | Stone | Sept. 2, 1913 |
| 1,132,833 | Coseo | Mar. 23, 1915 |
| 1,477,317 | Cornick | Dec. 11, 1923 |
| 1,486,715 | Wood | Mar. 11, 1924 |
| 1,561,358 | Sarnelle | Nov. 10, 1925 |
| 1,662,614 | Mandolini | Mar. 13, 1928 |
| 1,745,179 | Milne | Jan. 28, 1930 |
| 1,888,615 | Berdon | Nov. 22, 1932 |
| 2,097,492 | Lang | Nov. 2, 1937 |
| 2,167,961 | Sachs | Aug. 1, 1939 |